United States Patent
Yu et al.

(10) Patent No.: US 12,119,004 B2
(45) Date of Patent: Oct. 15, 2024

(54) SYSTEMS AND METHODS FOR VOICE AUDIO DATA PROCESSING

(71) Applicant: ZHEJIANG TONGHUASHUN INTELLIGENT TECHNOLOGY CO., LTD., Zhejiang (CN)

(72) Inventors: Yichen Yu, Hangzhou (CN); Yunsan Guo, Hangzhou (CN)

(73) Assignee: ZHEJIANG TONGHUASHUN INTELLIGENT TECHNOLOGY CO., LTD., Hangzhou (CN)

( * ) Notice: Subject to any disclaimer, the term of this patent is extended or adjusted under 35 U.S.C. 154(b) by 330 days.

(21) Appl. No.: 17/447,068

(22) Filed: Sep. 8, 2021

(65) Prior Publication Data

US 2022/0084525 A1    Mar. 17, 2022

(30) Foreign Application Priority Data

Sep. 17, 2020 (CN) .......................... 202010980844.2
Oct. 15, 2020 (CN) .......................... 202011104858.4

(51) Int. Cl.
*G06F 15/00* (2006.01)
*G06F 40/109* (2020.01)
(Continued)

(52) U.S. Cl.
CPC ............ *G10L 15/26* (2013.01); *G06F 40/109* (2020.01); *G06N 20/00* (2019.01); *G10L 25/27* (2013.01); *G10L 25/63* (2013.01)

(58) Field of Classification Search
CPC ......... G10L 15/26; G10L 25/63; G10L 25/27; G10L 17/00; G10L 17/16; G10L 17/26; G10L 25/51; G10L 25/66; G10L 2021/02166; G10L 21/02; G10L 21/0272; G10L 15/20; G06F 40/109; G06F 40/103; G06F 40/12; G06F 40/279; G06F 3/167; G06F 3/16; G06F 3/162; G06F 3/165; G06N 20/00; G06N 3/02; G06Q 30/0201; G06Q 30/0202; G06Q 50/01; H04R 3/005;
(Continued)

(56) References Cited

U.S. PATENT DOCUMENTS 11,006,097 B1 * 5/2021 Elmieh ................ H04N 9/3179
2011/0158426 A1 * 6/2011 Matsuo ................ H04R 3/005
                                                      381/94.1
(Continued)

FOREIGN PATENT DOCUMENTS

CN    101819758 A    9/2010
CN    104967717 A    10/2015
(Continued)

*Primary Examiner* — Michael Ortiz-Sanchez
(74) *Attorney, Agent, or Firm* — METIS IP LLC

(57) ABSTRACT

The present disclosure may provide a voice audio data processing system. The voice audio data processing system may obtain voice audio data, which includes one or more voices, each being respectively associated with one of one or more subjects. For one of the one or more voices and the subject associated with the voice, the voice audio processing system may generate a text based on the voice audio data. The text may have one or more sizes, each size corresponding to one of one or more volumes of the voice. The text may have one or more colors, each color corresponding to one of one or more emotion types of the voice.

18 Claims, 11 Drawing Sheets

(51) Int. Cl.
*G06N 20/00* (2019.01)
*G10L 15/26* (2006.01)
*G10L 25/00* (2013.01)
*G10L 25/27* (2013.01)
*G10L 25/63* (2013.01)

(58) Field of Classification Search
CPC .... H04R 1/406; H04R 1/342; H04R 2410/05; H04R 2410/00; H04R 2430/25
See application file for complete search history.

(56) References Cited

U.S. PATENT DOCUMENTS

| | | | | |
|---|---|---|---|---|
| 2013/0275873 | A1* | 10/2013 | Shaw | G01B 21/00 |
| | | | | 715/716 |
| 2014/0163983 | A1 | 6/2014 | Kim | |
| 2016/0133257 | A1 | 5/2016 | Namgoong et al. | |
| 2019/0250245 | A1* | 8/2019 | Koyama | H04R 3/005 |
| 2019/0373336 | A1* | 12/2019 | Kim | H04N 21/233 |
| 2020/0302952 | A1* | 9/2020 | Pinkus | H04W 4/80 |
| 2020/0312327 | A1 | 10/2020 | Zhu | |
| 2021/0042507 | A1* | 2/2021 | Raviv | G06V 40/165 |
| 2021/0335354 | A1* | 10/2021 | Park | G10L 15/063 |

FOREIGN PATENT DOCUMENTS

| | | | | |
|---|---|---|---|---|
| CN | 106772247 A | | 5/2017 | |
| CN | 106873800 A | | 6/2017 | |
| CN | 107464566 A | * | 12/2017 | ............ G10L 15/22 |
| CN | 107592255 A | | 1/2018 | |
| CN | 107910006 A | * | 4/2018 | |
| CN | 109784128 A | | 5/2019 | |
| CN | 110364185 A | | 10/2019 | |
| CN | 110673819 A | | 1/2020 | |
| CN | 111128180 A | | 5/2020 | |
| CN | 111464827 A | | 7/2020 | |
| CN | 111586469 A | | 8/2020 | |
| CN | 111597828 A | | 8/2020 | |
| CN | 111627456 A | | 9/2020 | |
| CN | 111726696 A | | 9/2020 | |
| WO | WO-2021260611 A1 | * | 12/2021 | ........... G06F 40/103 |

* cited by examiner

500

```
┌─────────────────────────────────────────────────────────────────┐
│ Obtaining voice audio data, which includes one or more voices,  │  510
│ each being respectively associated with one of one or more      │
│ subjects                                                         │
└─────────────────────────────────────────────────────────────────┘
                                │
                                ▼
┌─────────────────────────────────────────────────────────────────┐
│ For one of the one or more voices and the subject associated    │
│ with the voice, generating a text based on the voice audio      │  520
│ data, wherein: the text has one or more sizes, each size        │
│ corresponding to one of one or more volumes of the voice, and   │
│ the text has one or more colors, each color corresponding to    │
│ one of one or more emotion types of the voice                    │
└─────────────────────────────────────────────────────────────────┘
```

```
┌─────────────────────────────────────────────────────────────────┐  710
│ Obtaining voice audio data, which includes one or more voices,  │
│ each being respectively associated with one of one or more      │
│ subjects                                                        │
└─────────────────────────────────────────────────────────────────┘
                                 │
                                 ▼
┌─────────────────────────────────────────────────────────────────┐  720
│ For each of the one or more voices and the subject associated   │
│ with the voice, generating a text based on the voice audio data │
└─────────────────────────────────────────────────────────────────┘
                                 │
                                 ▼
┌─────────────────────────────────────────────────────────────────┐  730
│ Determining location information of a voice source corresponding│
│ to the voice based on the voice audio data                      │
└─────────────────────────────────────────────────────────────────┘
                                 │
                                 ▼
┌─────────────────────────────────────────────────────────────────┐  740
│ Instructing a display device to display the text based on the   │
│ location information of the voice source                        │
└─────────────────────────────────────────────────────────────────┘
```

SYSTEMS AND METHODS FOR VOICE AUDIO DATA PROCESSING

CROSS-REFERENCE TO RELATED APPLICATIONS

This application claims priority to Chinese Patent Application No. 202010980844.2 filed on Sep. 17, 2020, and Chinese Patent Application No. 202011104858.4 filed on Oct. 15, 2020, the entire contents of each of which are hereby incorporated by reference.

TECHNICAL FIELD

The present disclosure generally relates to voice audio data processing, and in particular, to systems and methods for generating a text associated with voice audio data.

BACKGROUND

Voice audio data of a subject can be converted into text to indicate the contents that the subject speaks and displayed in the form of the text, facilitating visualization and easier access to the contents. However, additional information associated with the voice audio data such as emotions, volumes, or locations of the subject often get lost in this process. Therefore, it is desirable to provide systems and methods for intelligent voice-text conversion, allowing for the inclusion and dynamic display of not only the text, but also additional information associated with the voice audio data.

SUMMARY

According to one aspect of the present disclosure, a system may be provided. The system may include: at least one storage device including a set of instructions; and at least one processor in communication with the at least one storage device, wherein when executing the set of instructions, the at least one processor may be configured to cause the system to: obtain voice audio data, which includes one or more voices, each being respectively associated with one of one or more subjects; and for one of the one or more voices and the subject associated with the voice, generate a text based on the voice audio data. The text may have one or more sizes, each size corresponding to one of one or more volumes of the voice. The text may have one or more colors, each color corresponding to one of one or more emotion types of the voice.

In some embodiments, the at least one processor may be further configured to cause the system to instruct a display device to display the text.

In some embodiments, to determine one of the one or more emotion types and the color corresponding to the emotion type, the at least one processor may be configured to cause the system to: determine, based on the voice audio data, the emotion type with a trained emotion determination model; and determine the color corresponding to the emotion type based on the emotion type.

In some embodiments, to determine the color corresponding to one of the one or more emotion types of the voice, the at least one processor may be configured to cause the system to: determine, based on the voice audio data, one or more preliminary emotion types and one or more confidence values corresponding to the one or more preliminary emotion types with a trained emotion determination model; and determine the color corresponding to the emotion type of the voice based on the one or more preliminary emotion types and the one or more confidence values.

In some embodiments, to determine the color corresponding to the emotion type of the voice based on the one or more preliminary emotion types and the one or more confidence values, the at least one processor may be configured to cause the system to: determine one or more weights corresponding to the one or more preliminary emotion types based on the one or more confidence values; determine one or more gamuts corresponding to the one or more preliminary emotion types; and determine the color corresponding to the emotion type of the voice based on the one or more weights and the one or more gamuts.

In some embodiments, to determine the size corresponding to one of the one or more volumes of the voice, the at least one processor may be configured to cause the system to: obtain a reference size corresponding to a reference volume of a reference voice; determine a ratio of the volume to the reference volume; and determine the size corresponding to the volume of the voice based on the ratio and the reference size.

In some embodiments, to determine the size corresponding to one of the one or more volumes of the voice, the at least one processor may be configured to cause the system to: obtain a first size corresponding to a predetermined maximum volume; obtain a second size corresponding to a predetermined minimum volume; and determine the size corresponding to the volume of the voice based on the volume of the voice, the first size, the second size, the predetermined maximum volume, and the predetermined minimum volume.

In some embodiments, the at least one processor may be configured to cause the system to: determine location information of a voice source corresponding to the voice; and instruct a display device to display the text based on the location information of the voice source.

In some embodiments, the voice audio data may be collected by a voice collection device. The voice connection device may include a plurality of voice collection modules disposed in different locations of an environment where the one or more subjects are located.

In some embodiments, the location information of the voice source may include at least one of a location of the voice source relative to a location of one of the plurality of voice collection modules or a distance between the voice source and one of the plurality of voice collection modules.

In some embodiments, to determine location information of a voice source corresponding to the voice, the at least one processor may be configured to cause the system to: determine one or more phases of one or more signals corresponding to the voice collected by one or more of the plurality of voice connection modules, respectively; determine at least one phase difference between the one or more phases; and determine the location information of the voice source based on the at least one phase difference.

In some embodiments, to determine location information of a voice source corresponding to the voice, the at least one processor may be configured to cause the system to: for each of at least two of the plurality of voice collection modules, determine a distance between the voice source and the voice collection module; and determine a spherical surface with a location of the voice collection module as a center and the distance as a radius; and determine the location information of the voice source based on location information of an intersection between at least two spherical surfaces corresponding to the at least two voce collection modules.

In some embodiments, to instruct a display device to display the text based on the location information of the voice source, the at least one processor may be configured to cause the system to: determine a first coordinate of the one of the plurality of voice collection modules in a coordinate system; determine a second coordinate of the voice source in the coordinate system based on the first coordinate and the location information of the voice source; and instruct the display device to display the text at the second coordinate.

According to another aspect of the present disclosure, a method may be provided. The method may be implemented on a computing device having at least one processor, at least one storage medium, and a communication platform connected to a network. The method may include: obtaining voice audio data, which includes one or more voices, each being respectively associated with one of one or more subjects; and for one of the one or more voices and the subject associated with the voice, generating a text based on the voice audio data. The text may have one or more sizes, each size corresponding to one of one or more volumes of the voice. The text may have one or more colors, each color corresponding to one of one or more emotion types of the voice.

In some embodiments, the determining one of the one or more emotion types and the color corresponding to the emotion type may include: determining, based on the voice audio data, the emotion type with a trained emotion determination model; and determining the color corresponding to the emotion type based on the emotion type.

In some embodiments, the determining the color corresponding to one of the one or more emotion types of the voice may include: determining, based on the voice audio data, one or more preliminary emotion types and one or more confidence values corresponding to the one or more preliminary emotion types with a trained emotion determination model; and determining the color corresponding to the emotion type of the voice based on the one or more preliminary emotion types and the one or more confidence values.

In some embodiments, the determining the color corresponding to the emotion type of the voice based on the one or more preliminary emotion types and the one or more confidence values may include: determining one or more weights corresponding to the one or more preliminary emotion types based on the one or more confidence values; determining one or more gamuts corresponding to the one or more preliminary emotion types; and determining the color corresponding to the emotion type of the voice based on the one or more weights and the one or more gamuts.

In some embodiments, the method may further include: determining location information of a voice source corresponding to the voice; and instructing a display device to display the text based on the location information of the voice source.

According to another aspect of the present disclosure, a non-transitory computer readable medium may be provided. The non-transitory computer readable medium nay include executable instructions that, when executed by at least one processor, directs the at least one processor to perform a method. The method may include: obtaining voice audio data, which includes one or more voices, each being respectively associated with one of one or more subjects; and for one of the one or more voices and the subject associated with the voice, generating a text based on the voice audio data. The text may have one or more sizes, each size corresponding to one of one or more volumes of the voice. The text may have one or more colors, each color corresponding to one of one or more emotion types of the voice.

In some embodiments, the method may further include: causing the system to instruct a display device to display the text.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 5 is a flowchart illustrating an exemplary process for processing voice audio data according to some embodiments of the present disclosure;

FIG. 7 is a flowchart illustrating an exemplary process for processing voice audio data according to some embodiments of the present disclosure;

DETAILED DESCRIPTION

Figure 1:
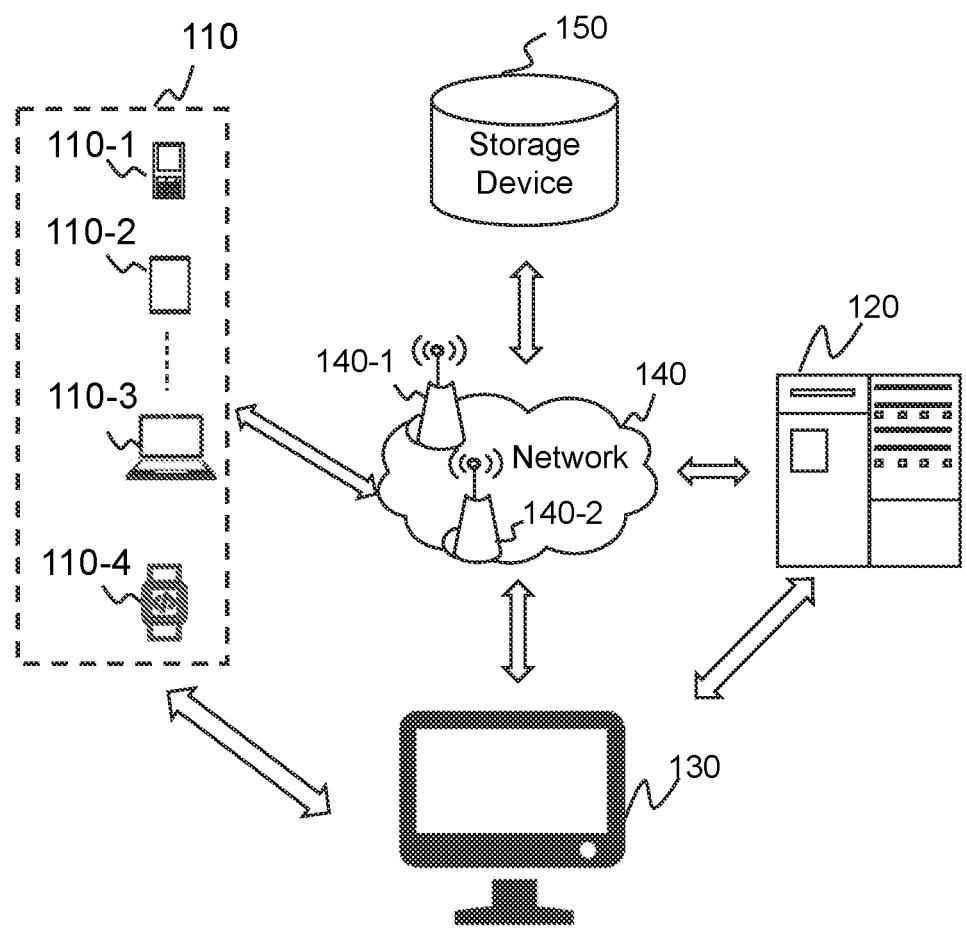
FIG. 1 is a schematic diagram illustrating an exemplary voice audio data processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be understood that the terms "system," "unit," "module," and/or "block" used herein are one method to distinguish different components, elements, parts, sections, or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for processing voice audio data of one or more subjects. The voice audio data may include one or more voices, each of which may be respectively associated with one of the one or more subjects. Here, "voice audio data" may refer to recording, file, or other medium formats that include audio and the audio includes voices; a "voice" may refer to sound or sounds that can be discerned or perceived to express certain meaning; a "subject" is the source of the voice. In some embodiments, the subjects are all humans. In some embodiments, the subjects may include voice sources other than humans (e.g., voice source controlled by artificial intelligence). For one of the one or more voices and the subject associated with the voice, the systems may generate a text based on the voice audio data. In some embodiments, the systems may generate multiple texts, each corresponding to one of the one or more voices. The multiple texts may be combined (e.g., in a chronicle manner) to generate a combined text that reflect all the contents of the one or more voices. The text of the subject may have the content that the subject speaks in the voice audio data. The systems may also determine one or more sizes of the text, each of which may correspond to one or more volumes of the voice. The systems may also determine one or more colors of the text, each of which may correspond to one of one or more emotion types of the voice. Therefore, the text created in this manner would indicate multifaceted information of the subject, as included in the voice audio data.

Another aspect of the present disclosure relates to systems and methods for processing voice audio data of one or more subjects. The voice audio data may include one or more voices, each of which may be respectively associated with one of the one or more subjects. For each of the one or more voices and the subject associated with the voice, the systems may generate a text based on the voice audio data. The systems may also determine location information of one or more voice sources corresponding to the one or more voices based on the voice audio data, respectively. Further, the systems may instruct a display device to display one or more texts corresponding to the one or more subjects based on the location information of the one or more voice sources. Take a specific subject and a corresponding text as an example, the systems may instruct the display device to display the text at a location of a voice source corresponding to the subject, thereby facilitating to distinguish the contents spoken by different subjects.

FIG. 1 is a schematic diagram illustrating an exemplary voice audio data processing system according to some embodiments of the present disclosure. In some embodiments, the voice audio data processing system 100 may include a voice collection device 110, a processing device 120, a display device 130, a network 140, and a storage device 150. In some embodiments, the voice audio data processing system 100 may be used to convert voice audio data of one or more subjects (e.g., a person) into one or more texts corresponding to the one or more subjects.

The voice collection device 110 may be configured to collect voice audio data of one or more subjects. In some embodiments, the voice audio data may be input by a subject via the voice collection device 110. For example, the voice collection device 110 may include a mobile device 110-1, a tablet computer 110-2, a laptop computer 110-3, a wearable device 110-4, etc. In some embodiments, the voice collection device 110 may be disposed in an area (e.g., a classroom, a meeting room) and configured to collect voice audio data of one or more subjects generated in the area. For example, the voice collection device 110 may include a plurality of voice collection units (e.g., microphones) disposed in different positions of the area. In some embodiments, the voice collection device 110 may be connected to or communicated with one or more components (e.g., the processing device 120, the display device 130, the storage device 150) of the voice audio data processing system 100 via the network 140. In some embodiments, one or more of the voice collection device 110, the processing device 120, the display device 130, the storage device 150 are components of a single device.

In some embodiments, the processing device 120 may be configured to generate one or more texts associated with the voice audio data, each of which may correspond to one of the one or more subjects. In some embodiments, the processing device 120 may instruct the display device 130 to display the one or more texts. In some embodiments, the processing device 120 may include a single server or a server group. The server group may be centralized or distributed (e.g., the processing device 120 may be a distributed system). In some embodiments, the processing device 120 may be local or remote. For example, the processing device 120 may access information and/or data stored in the voice collection device 110, the display device 130, and/or the storage device 150 via the network 140. As another example, the processing device 120 may be directly connected to the voice collection device 110, the display device 130, and/or the storage device 150 to access stored information and/or data. In some embodiments, the processing device 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 including one or more components illustrated in FIG. 2 of the present disclosure.

In some embodiments, the processing device 120 may process information and/or data associated with voice audio data processing to perform one or more functions described in the present disclosure. In some embodiments, the processing device 120 may include one or more processing engines (e.g., single-core processing engine(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the processing device 120 may be connected to the network 140 to communicate with one or more components (e.g., the voice collection device 110, the display device 130, the storage device 150) of the voice audio data processing system 100. In some embodiments, the processing device 120 may be directly connected to or communicate with one or more components (e.g., the voice collection device 110, the display device 130, the storage device 150) of the voice audio data processing system 100.

The display device 130 may be configured to display relevant information associated with voice audio data processing. In some embodiments, the display device 130 may display the one or more texts associated with the voice audio data of the one or more subjects. In some embodiments, the display device 130 may include a liquid crystal display (LCD), a flat panel display, a curved panel display, a television device, a cathode ray tube (CRT), or the like, or any combination thereof. In some embodiments, the display device 130 may be connected to or communicated with one or more components (e.g., the voice collection device 110, the processing device 120, the storage device 150) of the voice audio data processing system 100 via the network 140. In some embodiments, the display device 130 may be directly connected to or communicated with one or more components (e.g., the voice collection device 110, the processing device 120, the storage device 150) of the voice audio data processing system 100.

The network 140 may facilitate exchange of information and/or data. In some embodiments, one or more components (e.g., the voice collection device 110, the processing device 120, the display device 130, the storage device 150) of the voice audio data processing system 100 may transmit information and/or data to other component(s) of the voice audio data processing system 100 via the network 140. For example, the processing device 120 may obtain the voice audio data from the storage device 150 via the network 140. In some embodiments, the network 140 may be any type of wired or wireless network, or a combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points (e.g., a point 140-1, a point 140-2), through which one or more components of the voice audio data processing system 100 may be connected to the network 140 to exchange data and/or information.

The storage device 150 may store data and/or instructions. In some embodiments, the storage device 150 may store data obtained from the voice collection device 110, the processing device 120, the display device 130, or an external storage device. For example, the storage device 150 may store the voice audio data collected by the voice collection device 110. In some embodiments, the storage device 150 may store data and/or instructions that the processing device 120 may execute or use to perform exemplary methods described in the present disclosure. For example, the storage device 150 may store instructions that the processing device 120 may execute or use to generate one or more texts associated with the voice audio data, each of which may correspond to one of the one or more subjects.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components (e.g., the voice collection device 110, the processing device 120, the display device 130) of the voice audio data processing system 100. One or more components of the voice audio data processing system 100 may access the data or instructions stored in the storage device 150 via the network 140. In some embodiments, the storage device 150 may be directly connected to or communicate with one or more components (e.g., the voice collection device 110, the processing device 120, the display device 130) of the voice audio data processing system 100. In some embodiments, the storage device 150 may be part of the processing device 120. For example, the storage device 150 may be integrated into the processing device 120.

It should be noted that the voice audio data processing system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. In some embodiments, the voice audio data processing system 100 may also include a user device (not shown) configured to receive information and/or data from the voice collection device 110, the processing device 120, the display device 130, and/or the storage device 150. The user device may provide a user interface via which a user may view information (e.g., the one or more texts) and/or input data (e.g., the voice audio data) and/or instructions to the voice audio data processing system 100.

In some embodiments, the voice collection device 110, the processing device 120, the display device 130, and the storage device 150 may be separated devices. In some embodiments, at least one of the voice collection device 110, the processing device 120, the display device 130, and the storage device 150 may be integrated as a single device configured to implement the functions of the at least one component. For example, the voice collection device 110, the processing device 120, the display device 130, and the storage device 150 may be integrated as a single device configured to collect the voice audio data and generate the one or more texts associated with the voice audio data.

Figure 2:
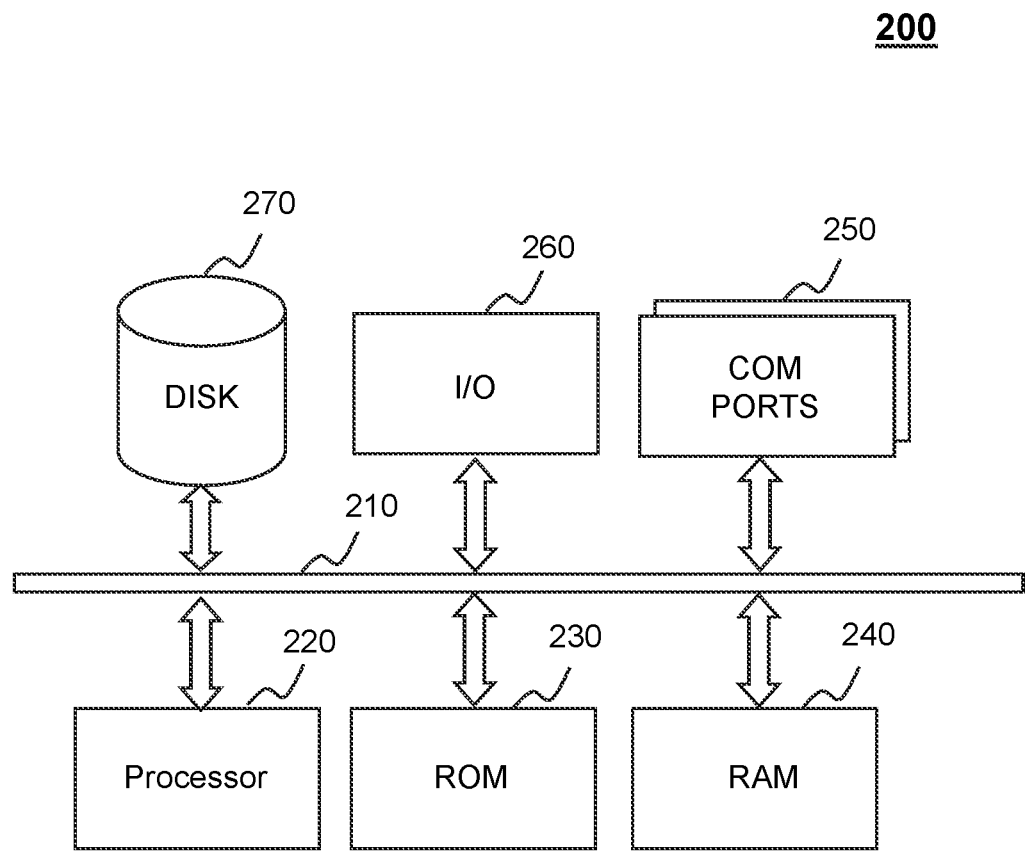
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the voice audio data processing system 100 as described herein. For example, the processing device 120 may be implemented on the computing device 200, via its hardware, software program, firmware, or a combination thereof. Although only one such computer is shown, for convenience, the computer functions relating to voice audio data processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., a magnetic storage device, a flash memory, or other non-volatile solid state memories) (not shown), a disk 270, a read-only memory (ROM) 230, a random-access memory (RAM) 240, or the like, or any combination thereof. In some embodiments, the one or more storages may further include a remote storage corresponding to the processor 220. The remote storage may connect to the computing device 200 via the network 140. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
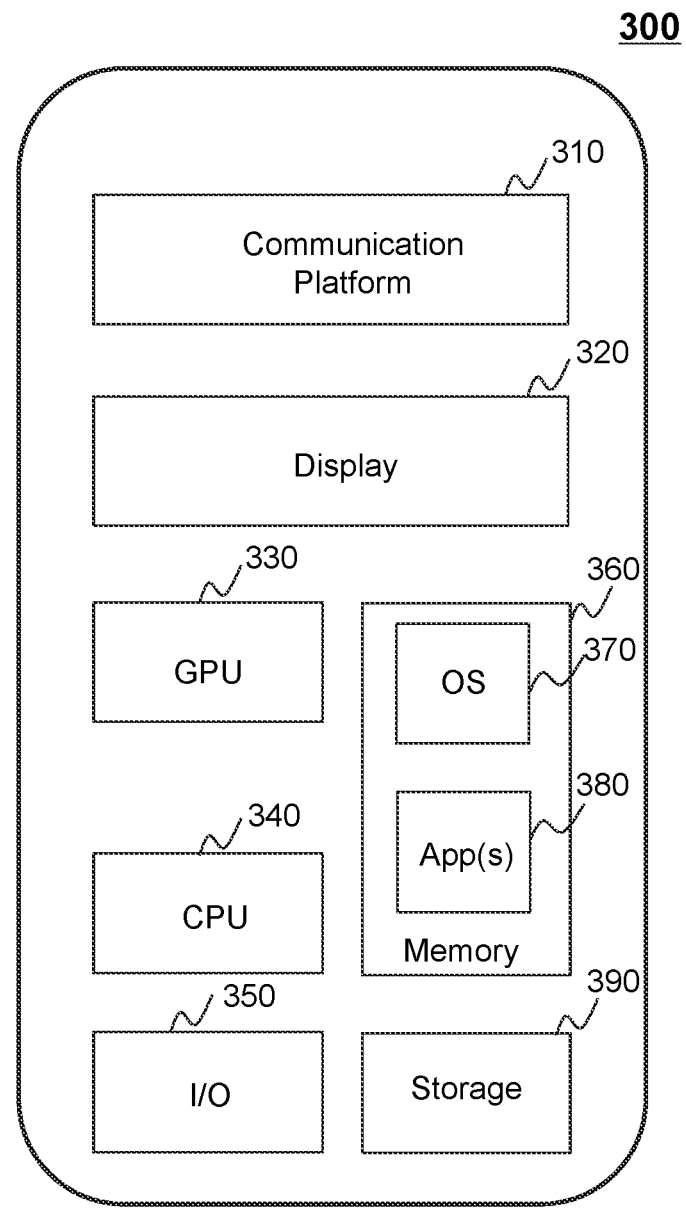
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 120 or the user device may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and a storage 390. In some embodiments, any other suitable components, including but not limited to a system bus or a controller (not shown), may also be in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to voice audio data processing or other information from the voice audio data processing system 100. User interactions with the information stream may be achieved via the I/O 350 and provided to the processing device 120 and/or other components of the voice audio data processing system 100 via the network 140.

Figure 4:
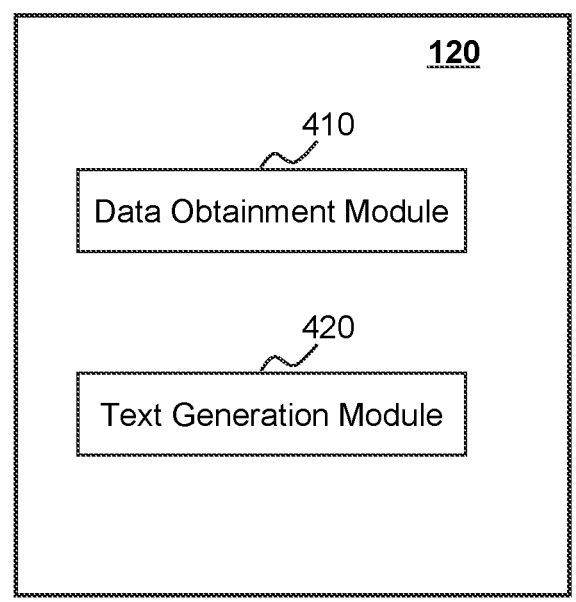
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may include a data obtainment module 410 and a text generation module 420.

In some embodiments, the data obtainment module 410 may be configured to obtain voice audio data. The voice audio data may include one or more voices, each of which may be respectively associated with one of one or more subjects (e.g., a person). For example, the voice audio data may include a barrage input by a subject via a voice collection device (e.g., the voice collection device 110). As another example, the voice audio data may include one or more voices of one or more subjects in an area (e.g., a classroom, a meeting room) collected by a voice collection device.

In some embodiments, for one of the one or more voices and the subject associated with the voice, the text generation module 420 may be configured to generate a text based on the voice audio data. In some embodiments, the text may have the content that the subject speaks. The text generation module 420 may generate the content of the text by processing the voice based on an automatic speech recognition (ASR) technique.

In some embodiments, the text may have one or more sizes, each of which may correspond to one of one or more volumes of the voice. In some embodiments, the volume of the voice positively corresponds to the size of the text, i.e., the higher the volume of the voice is, the larger the size of the text. In some embodiments, the volume of the voice negatively corresponds to the size of the text, i.e., the higher the volume of the voice is, the smaller the size of the text.

In some embodiments, a relationship between size and voice volume may be predetermined, for example, using a fitting algorithm. The text generation module 420 may determine the size corresponding to the volume of the voice based on the volume and the relationship between size and voice volume. In some embodiments, the text may have one or more colors, each of which may correspond to one of one or more emotion types of the voice. More descriptions of the one or more sizes and the one or more colors may be found elsewhere in the present disclosure, for example, operation 520 and the descriptions thereof.

In some embodiments, the processing device 120 may include a display module (not shown in FIG. 4). The display module may be configured to instruct a display device (e.g., the display device 130) to display the text. In some embodiments, take a specific voice and a corresponding subject associated with the voice, the text generation module 420 may be configured to determine location information of a voice source corresponding to the voice and the display module may be configured to instruct the display device to display the text based on the location information of the voice source. In some embodiments, the display module may instruct the display device to display the text at a location of the voice source.

FIG. 5 is a flowchart illustrating an exemplary process for processing voice audio data according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process illustrated in FIG. 5 and described below is not intended to be limiting.

In 510, the processing device 120 (e.g., the data obtainment module 410) (e.g., the interface circuits of the processor 220) may obtain voice audio data. The voice audio data may include one or more voices, each being respectively associated with one of one or more subjects (e.g., a person). For example, the voice audio data may include a barrage input by a subject via a voice collection device (e.g., the voice collection device 110). As another example, the voice audio data may include one or more voices of one or more subjects in an area (e.g., a classroom, a meeting room) collected by a voice collection device (e.g., the voice collection device 110). In some embodiments, the processing device 112 may obtain the voice audio data from a storage device (e.g., the storage device 150) of the voice audio data processing system 100, an external device, etc.

In 520, for one of the one or more voices and the subject associated with the voice, the processing device 120 (e.g., the text generation module 420) (e.g., the processing circuits of the processor 220) may generate a text based on the voice audio data. In some embodiments, the text may have the content that the subject speaks. The processing device 120 may generate the content of the text by processing the voice based on an automatic speech recognition (ASR) technique.

In some embodiments, the text may have one or more sizes, each of which may correspond to one of one or more volumes of the voice. In some embodiments, the volume of the voice positively corresponds to the size of the text, i.e., the higher the volume of the voice is, the larger the size of the text. In some embodiments, the volume of the voice negatively corresponds to the size of the text, i.e., the higher the volume of the voice is, the smaller the size of the text. In some embodiments, a relationship between size and voice volume may be predetermined, for example, using a fitting algorithm. The processing device 120 may determine the size corresponding to the volume of the voice based on the volume and the relationship between size and voice volume.

In some embodiments, the processing device 120 may obtain a reference size corresponding to a reference volume of a reference voice and determine a ratio of the volume of the voice to the reference volume. The processing device 120 may determine the size corresponding to the volume of the voice based on the ratio and the reference size. In some embodiments, the processing device 120 may designate a product of the ratio and the reference size as the size corresponding to the volume of the voice. For example, assuming that the reference volume is 50 dB, the reference size is font 10, and the volume of the voice is 25 dB, the size corresponding to the volume of the voice may be font 5. In some embodiments, the processing device 120 may determine the size of the text based on a lockstep corresponding relationship between the voice volume and the text size. For example, when the voice volume is between 25-50 dB, the text size is font 10; when the voice volume is between 50-60 dB, the text size is font 11; when the voice volume is between 60-70 dB, the text size is font 12, etc. In some embodiments, the reference size and/or the reference volume may be predetermined based on a big data analysis technique. For example, the reference volume may be an average of massive reference voices of reference subjects, and the reference size corresponding to the reference volume may then be preset based on practical demands.

In some embodiments, the processing device 120 may obtain a first size corresponding to a predetermined maximum volume and a second size corresponding to a predetermined minimum volume. The processing device 120 may determine the size corresponding to the volume of the voice based on the volume of the voice, the first size, the second size, the predetermined maximum volume, and the predetermined minimum volume. In some embodiments, the processing device 120 may normalize the volume of the voice based on the predetermined maximum volume and the predetermined minimum volume. The processing device 120 may determine the size corresponding to the volume of the voice based on the normalized volume of the voice, the first size, and the second size according to Equation (1) below:

$$F = F_{min} + (F_{max} - F_{min}) * \frac{S_0 - S_{min}}{S_{max} - S_{min}}$$

wherein F refers to the size corresponding to the volume of the voice, $F_{max}$ refers to the first size, $F_{min}$ refers to the second size, $S_0$ refers to the volume of the voice, $S_{min}$ refers to the predetermined minimum volume, and $S_{max}$ refers to the predetermined maximum volume. For example, assuming that the predetermined maximum volume is 80 dB, the predetermined minimum volume is 20 dB, the first size is font 40, the second size is font 10, the volume of the voice is 50 dB, the size corresponding to the volume of the voice may be font 25.

In some embodiments, the relationship between size and voice volume may be non-linear. In some embodiments, voice volumes may be divided into a plurality of sections, each of which may correspond to one size. The processing device 120 may determine one of the plurality of sections where the volume of the voice is and designate a size corresponding to the section as the size of the voice. In some embodiments, a step length of each section may be the same or different. For example, at least one step length of at least one section corresponding to voice volumes smaller than a first threshold and at least one step length of at least one section corresponding to voice volumes larger than a second threshold may be larger than at least one step length of at least one section corresponding to voice volumes between the first threshold and the second threshold.

In some embodiments, the volume of the voice may include a volume of the voice collected by the voice connection device, a volume of a voice source corresponding to the voice, etc. In some embodiments, the volume of the voice collected by the voice collection device may be represented by an amplitude of a signal corresponding to the voice. The processing device 120 may determine an amplitude of a signal corresponding to the voice collected by the voice collection device and determine the volume of the voice collected by the voice collection device based on the amplitude.

In some embodiments, the processing device 120 may determine a location of the voice source. The processing device 120 may determine the volume of the voice source based on the location of the voice source and the volume of the voice collected by the voice connection device using a volume attenuation equation. In some embodiments, the processing device 120 may determine a distance between the voice source and the voice collection device based on the location of the voice source. The processing device 120 may determine the volume of the voice source based on the distance using the volume attenuation equation.

In some embodiments, the volume attenuation equation may be predetermined using a fitting algorithm. The volume attenuation equation may be determined based on reference volumes of reference voices collected by a plurality of reference voice collection devices, distances of which to a reference voice source corresponding to the reference voices are different. More descriptions of determining the location of the voice source and/or the distance may be found elsewhere in the present disclosure, for example, FIG. 7 and the descriptions thereof.

In some embodiments, the text may have one or more colors, each of which may correspond to one of one or more emotion types of the voice. For example, the emotion type of the voice may include "glad," "angry," "sad," "peaceful," "happy," "surprised," "disgusted," "worried," "disappointed," etc. In some embodiments, a relationship between color and emotion type may be predetermined. For example, "glad" may correspond to "yellow." "Angry" may correspond to "red." "Sad" may correspond to "blue." "Peaceful" may correspond to "black.".

In some embodiments, the processing device 120 may determine one or more preliminary emotion types and one or more confidence values corresponding to the one or more preliminary emotion types with a trained emotion determination model. For example, the processing device 120 may input the voice audio data, the voice, and/or the content of the text into the trained emotion determination model, and the trained emotion determination model may output the one or more preliminary emotion types and the one or more confidence values. The one or more preliminary emotion types may be one or more candidates of the emotion type of the subject. The higher a confidence value corresponding to one of the one or more preliminary emotion types, the more probability that the preliminary emotion type may be considered as the emotion type. In some embodiments, the trained emotion determination model may be determined based on a machine learning technique.

In some embodiments, the processing device 120 may determine the color corresponding to the emotion type of the voice based on the one or more preliminary emotion types and the one or more confidence values. The processing device 120 may determine one or more weights corresponding to the one or more preliminary emotion types based on the one or more confidence values. The processing device 120 may determine one or more gamuts corresponding to the one or more preliminary emotion types, for example, based on the relationship between color and emotion type.

In some embodiments, the processing device 120 may determine the color corresponding to the emotion type of the voice based on the one or more weights and the one or more gamuts. In some embodiments, the processing device 120 may determine the color corresponding to the emotion type by performing a weighted summation of the one or more gamuts based on the one or more weights. For example, assuming that the one or more preliminary emotion types are "glad," "angry," "sad," and "peaceful," confidence values of which are 0.2, 0.6, 0.1, and 0.1 and gamuts of which are A, B, C, and D, a gamut corresponding to the emotion type may be equal to (0.2*A+0.6*B+0.1*C+0.1*D). The processing device 120 may designate a color corresponding to the gamut as the color corresponding to the emotion type of the subject.

It should be noted that the above descriptions are for illustration purposes and non-limiting. In some embodiments, the processing device 120 may directly determine the emotion type based on the voice audio data, the voice, and/or the content of the text with the trained emotion determination model and determine the color corresponding to the emotion type based on the emotion type and the predetermined relationship between emotion type and color. For example, the emotion determination model may designate one of the one or more preliminary emotion types having a highest confidence value as the emotion type.

In some embodiments, the relationship between emotion type and color may be one-to-many, that is, each emotion type may correspond to one or more candidate colors. The processing device 120 may determine and/or display the color of the text based on the one or more candidate colors and a background color of a scene where the text is displayed. For example, assuming that the emotion type is "glad" which corresponds to "black" and "red" in the relationship between emotion type and color, and the background color of the scene is black, the processing device 120 may display the text in red.

In some embodiments, the processing device 120 may instruct a display device (e.g., the display device 130) to display the text. As described above, the text may have the content that the subject speaks, the one or more volumes, and/or the one or more emotion types of the voice, such that the text can indicate multifaceted information of the voice audio data, thereby efficiently visualizing the voice audio data and enriching information of the text. In some embodiments, the voice audio data may include a barrage input by the subject while the subject watches a video, and the text may be displayed in a form of a barrage.

In some embodiments, take a specific voice and a corresponding subject associated with the voice, the processing device 120 may also determine location information of a voice source corresponding to the voice and instruct the display device to display the text based on the location information of the voice source. In some embodiments, the processing device 120 may instruct the display device to display the text at a location of the voice source. More descriptions of determining the location information of the voice source and/or instructing the display device to display the text based on the location information of the voice source may be found elsewhere in the present disclosure, for example, FIG. 7 and the descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more other optional operations (e.g., a storing operation) may be added elsewhere in the process 500. In the storing operation, the processing device 120 may store information and/or data (e.g., the text) associated with voice audio data processing in a storage device (e.g., the storage device 150, the ROM 230, the RAM 240, and/or the storage 390) disclosed elsewhere in the present disclosure.

Figure 6:
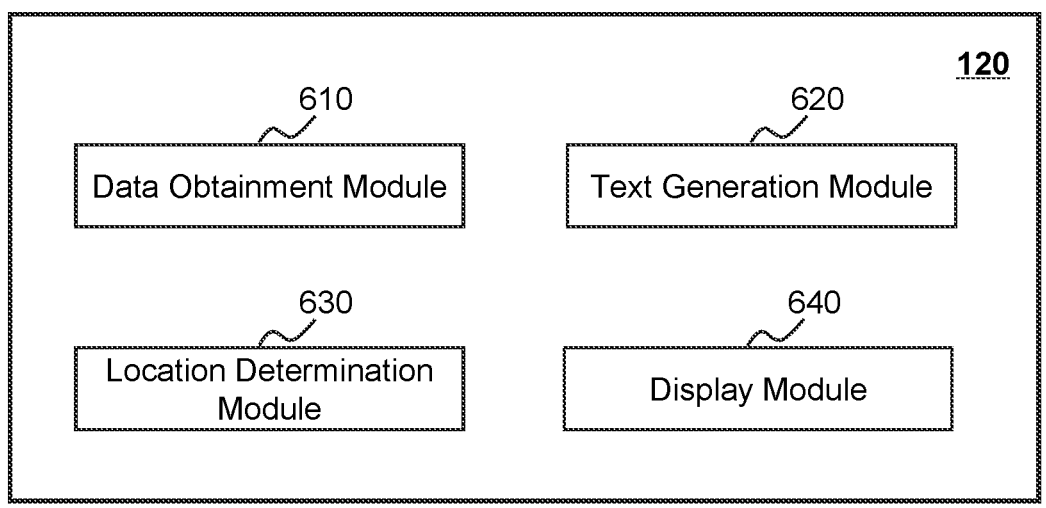
FIG. 6 is a block diagram illustrating an exemplary processing device according to some embodiments of the present disclosure.

FIG. 6 is a block diagram illustrating an exemplary processing device according to some embodiments of the present disclosure. The processing device 120 may include a data obtainment module 610, a text generation module 620, a location determination module 630, and a display module 640.

In some embodiments, the data obtainment module 610 may be configured to obtain voice audio data. The voice audio data may include one or more voices. Each of the one or more voices may be respectively associated with one of one or more subjects (e.g., a person). For example, the voice audio data may include one or more voices of one or more subjects in an area (e.g., a classroom, a meeting room) collected by a voice collection device (e.g., a microphone array).

In some embodiments, for one of the one or more voices and the subject associated with the voice, the text generation module 620 may be configured to generate a text based on the voice audio data. In some embodiments, the text may have the content that the subject speaks. The text generation module 620 may generate the content of the text by processing the voice based on an automatic speech recognition (ASR) technique.

In some embodiments, the text may also have one or more sizes (each of which corresponds to one of one or more volumes of the voice), one or more colors (each of which corresponds to one of one or more emotion types of the voice), etc. More descriptions of the one or more sizes, the one or more volumes, the one or more colors, the one or more emotion types of the voice may be found elsewhere in the present disclosure, for example, operation 520 and the descriptions thereof.

In some embodiments, the location determination module 630 may be configured to determine location information of a voice source (e.g., a mouth of a person) corresponding to the voice based on the voice audio data. In some embodiments, the voice collection device may include a plurality of voice collection modules (e.g., at least three microphones) disposed in different locations of an environment (e.g., a classroom, a meeting room) where the one or more subjects are located. The location information of the voice source may include a location of the voice source relative to a location of one of the plurality of voice collection modules, a distance between the voice source and one of the plurality of voice collection modules, etc.

In some embodiments, the location determination module 630 may determine one or more phases of one or more signals corresponding to the voice collected by one or more of the plurality of voice connection modules, respectively. The location determination module 630 may determine at least one phase difference between the one or more phases and determine the location information of the voice source based on the at least one phase difference. In some embodiments, the location determination module 630 may determine the at least one phase difference based on one or more time points when the voice is collected by the one or more voice collection modules, respectively.

In some embodiments, for each of at least two of the plurality of voice collection modules, the location determination module 630 may determine a distance between the voice source and the voice collection module. The location determination module 630 may determine a spherical surface with a location of the voice collection module as a center and the distance as a radius. The location determination module 630 may determine the location information of the voice source based on location information of an intersection between at least two spherical surfaces corresponding to the at least two voice collection modules. In some embodiments, the location determination module 630 may designate the location information of the intersection as the location information of the voice source.

In some embodiments, the display module 640 may be configured to display the text based on the location information of the voice source. In some embodiments, the display module 640 may determine a first coordinate of the one of the plurality of voice collection modules in a coordinate system. The display module 640 may determine a second coordinate of the voice source in the coordinate system based on the first coordinate and the location information of the voice source. In some embodiments, the display module 640 may instruct the display device to display the text at the second coordinate.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing device 120 may include a storage module (not shown) which may be used to store data generated by the above-mentioned modules.

FIG. 7 is a flowchart illustrating an exemplary process for processing voice audio data according to some embodiments of the present disclosure. In some embodiments, the process 700 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process illustrated in FIG. 7 and described below is not intended to be limiting.

In 710, the processing device 120 (e.g., the data obtainment module 610) (e.g., the interface circuits of the processor 220) may obtain voice audio data. The voice audio data may include one or more voices, each of which may be respectively associated with one of one or more subjects (e.g., a person). For example, the voice audio data may include one or more voices of one or more subjects in an area (e.g., a classroom, a meeting room) collected by a voice collection device (e.g., a microphone array). In some embodiments, the processing device 112 may obtain the voice audio data from a storage device (e.g., the storage device 150) of the voice audio data processing system 100, an external device, etc.

In 720, for one of the one or more voices and the subject associated with the voice, the processing device 120 (e.g., the text generation module 620) (e.g., the processing circuits of the processor 220) may generate a text based on the voice audio data. In some embodiments, the text may have the content that the subject speaks. The processing device 120 may generate the content of the text by processing the voice based on an automatic speech recognition (ASR) technique.

In some embodiments, the text may also have one or more sizes (each of which corresponds to one of one or more volumes of the voice), one or more colors (each of which corresponds to one of one or more emotion types of the voice), etc. More descriptions of the one or more sizes, the one or more volumes, the one or more colors, the one or more emotion types of the voice may be found elsewhere in the present disclosure, for example, operation 520 and the descriptions thereof.

In 730, the processing device 120 (e.g., the location determination module 630) (e.g., the processing circuits of the processor 220) may determine location information of a voice source (e.g., a mouth of a person) corresponding to the voice based on the voice audio data. In some embodiments, the voice collection device may include a plurality of voice collection modules (e.g., at least three microphones) disposed in different locations of an environment (e.g., a classroom, a meeting room) where the one or more subjects are located. The location information of the voice source may include a location of the voice source relative to a location of one of the plurality of voice collection modules, a distance between the voice source and one of the plurality of voice collection modules, etc.

In some embodiments, the processing device 120 may determine one or more phases of one or more signals corresponding to the voice collected by one or more of the plurality of voice connection modules, respectively. The processing device 120 may determine at least one phase difference between the one or more phases and determine the location information of the voice source based on the at least one phase difference. In some embodiments, the processing device 120 may determine the at least one phase difference based on one or more time points when the voice is collected by the one or more voice collection modules, respectively.

In some embodiments, for each of at least two of the plurality of voice collection modules, the processing device 120 may determine a distance between the voice source and the voice collection module. The processing device 120 may determine a spherical surface with a location of the voice collection module as a center and the distance as a radius. The processing device 120 may determine the location information of the voice source based on location information of an intersection between at least two spherical surfaces corresponding to the at least two voice collection modules. In some embodiments, the processing device 120 may designate the location information of the intersection as the location information of the voice source.

In 740, the processing device 120 (e.g., the display module 640) (e.g., the processing circuits of the processor 220) may display the text based on the location information of the voice source. In some embodiments, the processing device 120 may determine a first coordinate of the one of the plurality of voice collection modules in a coordinate system. The processing device 120 may determine a second coordinate of the voice source in the coordinate system based on the first coordinate and the location information of the voice source. For example, assuming that the first coordinate is $(x_1, y_1, z_1)$, and the location information of the voice source is $(x_2, y_2, z_2)$, the second coordinate may be $(x_2-x_1, y_2-y_1, z_2-z_1)$.

In some embodiments, the processing device 120 may instruct the display device to display the text at the second coordinate, i.e., the text may indicate the location information of the voice source (e.g., a mouth of the subject), thereby facilitating to distinguish different contents spoken by different subjects. In some embodiments, as described above, the text may also have the one or more sizes indicating the one or more volumes of the voice and the one or more colors indicating the one or more emotion types of the voice, thereby efficiently visualizing the voice audio data and enriching information of the text.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the processing device 120 may instruct the display device to display the text near (e.g., a distance to the subject smaller than a threshold) the coordinate of the subject so as to avoid covering the subject or other subjects in the area.

Figure 8:
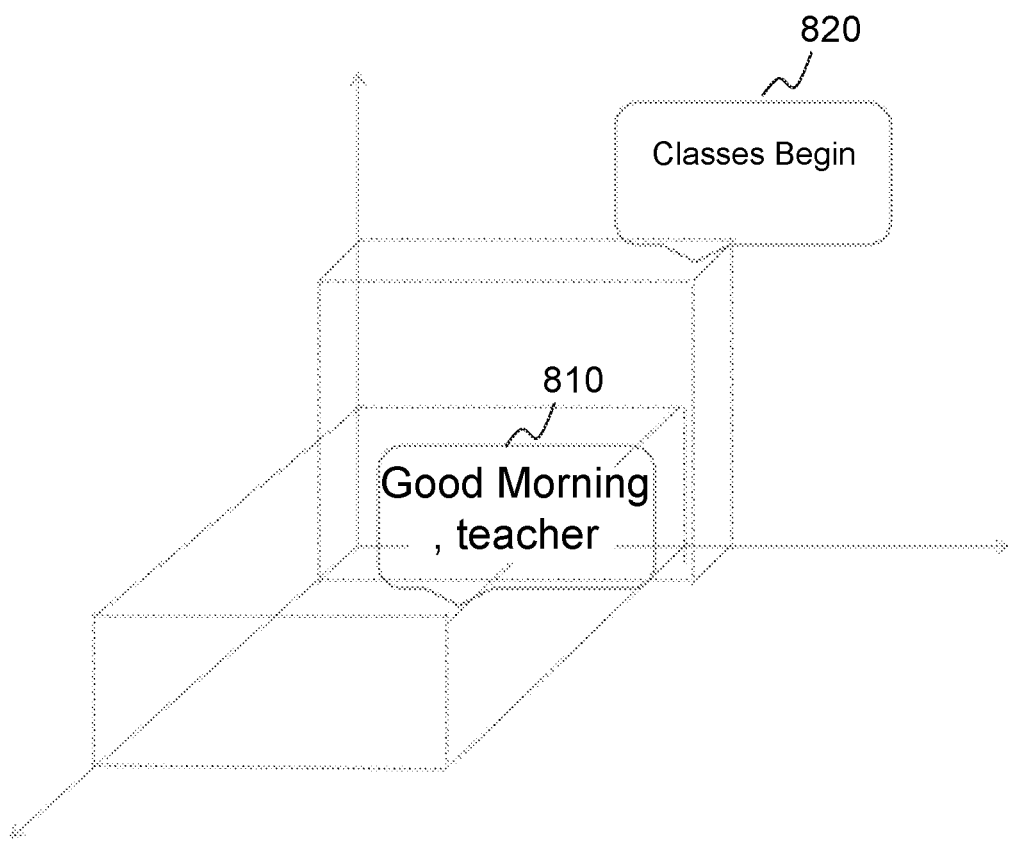
FIG. 8 is a schematic diagram illustrating an exemplary text display associated with voice audio data according to some embodiments of the present disclosure.

FIG. 8 is a schematic diagram illustrating an exemplary text display associated with voice audio data according to some embodiments of the present disclosure.

As shown in FIG. 8, there may be a plurality of students and a teacher in a classroom. A voice collection device may collect voices of the plurality of students and the teacher. The processing device 120 may generate a text 810 corresponding to the plurality of students and a text 820 corresponding to the teacher by processing the voices according to the process 700 described above. Positions of the text 810 and the text 820 may indicate positions of the plurality of students and the teacher, respectively. Besides, since voices of the plurality of students are louder than voices of the teacher, a size of the text 810 is larger than a size of the text 820.

Figure 9:
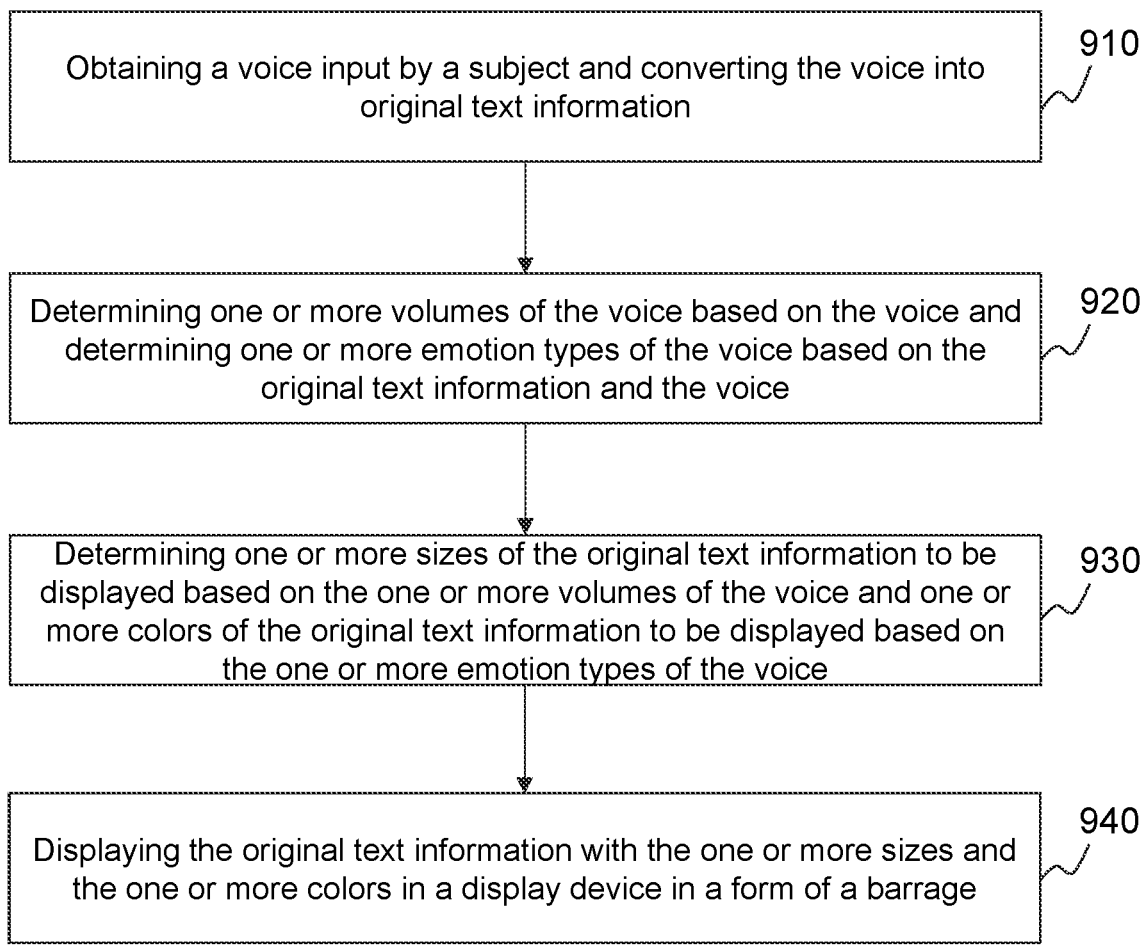
FIG. 9 is a flowchart illustrating an exemplary process for processing voice audio data according to some embodiments of the present disclosure.

FIG. 9 is a flowchart illustrating an exemplary process for processing voice audio data according to some embodiments of the present disclosure. In some embodiments, the process 900 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process illustrated in FIG. 9 and described below is not intended to be limiting.

In 910, the processing device 120 may obtain a voice (e.g., a barrage) input by a subject and convert the voice into original text information. The original text information may include the content that the subject speaks. In some embodiments, the process for determining the original text information may be the same as or similar to the process for determining the content of the text in FIG. 5, more descriptions of which may be not repeated.

In 920, the processing device 120 may determine one or more volumes of the voice based on the voice and determine one or more emotion types of the voice based on the original text information and the voice. In 930, the processing device 120 may determine one or more sizes of the original text information to be displayed based on the one or more volumes of the voice and one or more colors of the original text information to be displayed based on the one or more emotion types of the voice. In some embodiments, the processes for determining the one or more volumes, the one or more emotion types, the one or more sizes, and/or the one or more colors may be the same as or similar to the processes for determining the one or more volumes, the one or more emotion types, the one or more sizes, and/or the one or more colors of the voice in FIG. 5, respectively, more descriptions of which may be not repeated.

In 940, the processing device 120 may display the original text information with the one or more sizes and the one or more colors in a display device (e.g., an interface) in a form of a barrage.

Figure 10:
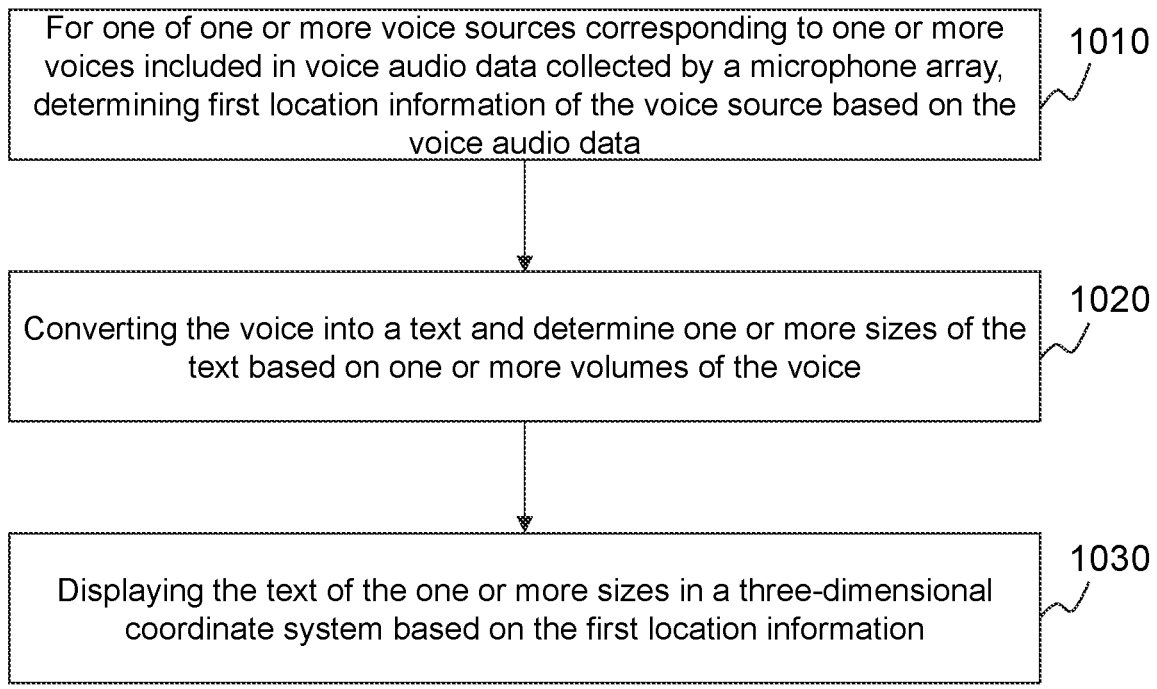
FIG. 10 is a flowchart illustrating an exemplary process for processing voice audio data according to some embodiments of the present disclosure.

FIG. 10 is a flowchart illustrating an exemplary process for processing voice audio data according to some embodiments of the present disclosure. In some embodiments, the process 1000 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process illustrated in FIG. 10 and described below is not intended to be limiting.

In 1010, for one of one or more voice sources corresponding to one or more voices included in voice audio data collected by a microphone array (e.g., at least three microphones), the processing device 120 may determine first location information of the voice source based on the voice audio data. In some embodiments, each of the one or more voices may be associated with one of one or more subjects, respectively. In some embodiments, the process for determining the first location information of the voice source may be the same as or similar to the process for determining the location information of the voice source in FIG. 5, more descriptions of which may be not repeated.

In 1020, the processing device 120 may convert the voice into a text and determine one or more sizes of the text based on one or more volumes of the voice. In some embodiments, the processes for determining each of the one or more sizes of the text may be the same as or similar to the processes for determining the size of the voice in FIG. 5, more descriptions of which may be not repeated.

In 1030, the processing device 120 may display the text of the one or more sizes in a three-dimensional coordinate system based on the first location information. Operation 1030 may be the same as or similar to operation 740, more descriptions of which may be not repeated.

Figure 11:
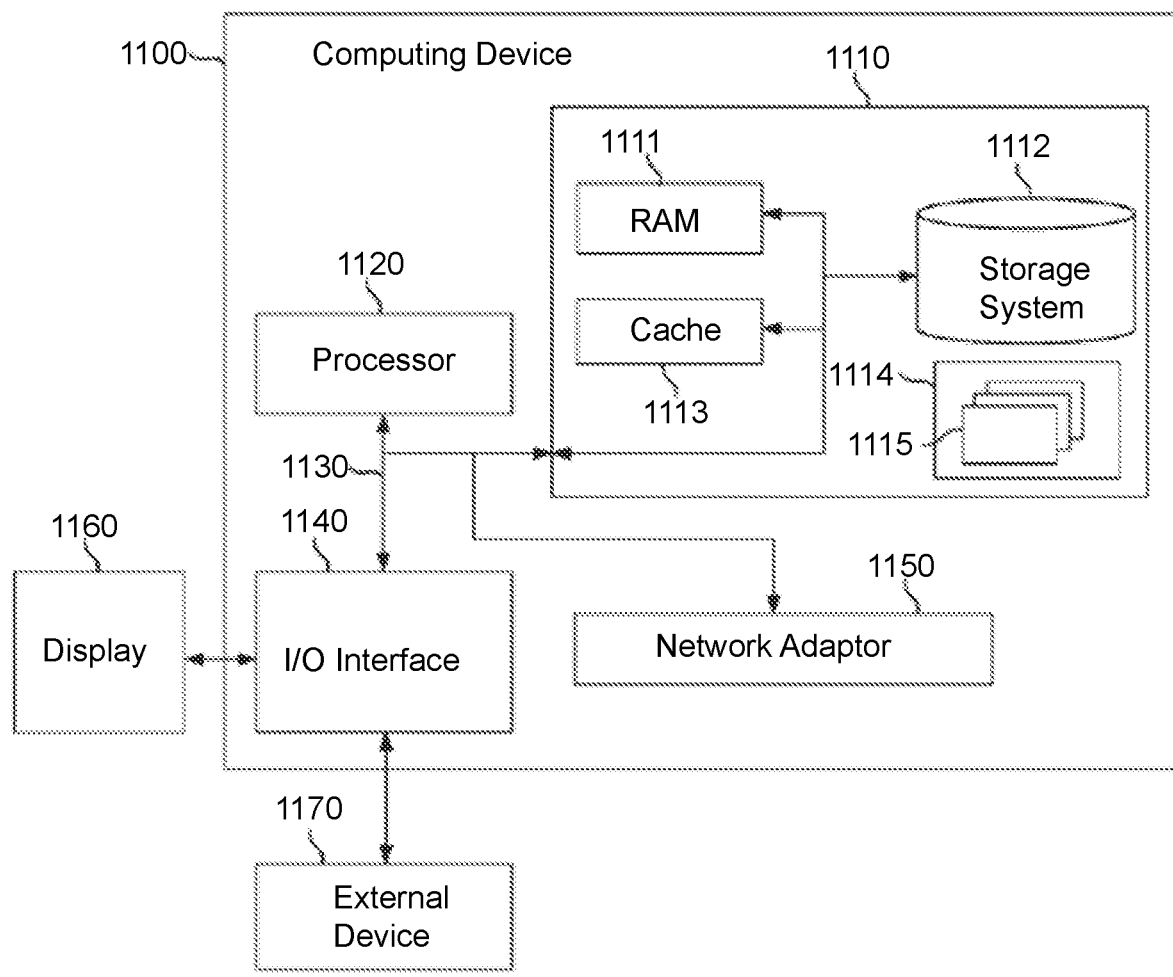
FIG. 11 is a schematic diagram illustrating an exemplary computing device according to some embodiments of the present disclosure.

FIG. 11 is a schematic diagram illustrating an exemplary computing device according to some embodiments of the present disclosure. The computing device 1100 in FIG. 11 may be merely an example and not be limited to the functions of some embodiments of the present disclosure.

As shown in FIG. 11, the computing device 1100 may include a storage device 1110, a processor 1120, and a bus 1130 connecting different components (e.g., the storage device 1110, the processor 1120) of the computing device 1100.

In some embodiments, the bus 1130 may include a memory bus, a memory controller, a peripheral bus, a graphic acceleration port, a processor, a local area bus, or the like, or any combination thereof. The bus 1130 may be of one or more bus structures, for example, an industrial standard architecture (ISA) bus, a micro channel architecture (MCA) bus, an enhanced ISA bus, a video electronic standard association (VESA) LAN bus, a peripheral component interconnect (PCI) bus, etc.

In some embodiments, the computing device 1100 may include a plurality of mediums that are accessible by the computing device 1100. The computing device 1100 may include a volatile medium, a nonvolatile medium, a removable medium, a non-removable medium, etc.

The storage device 1110 may include a computer readable medium in the form of a volatile memory, such as a random access memory (RAM) 1111, a cache memory 1113, etc. The computing device 1100 may also include other removable/non-movable media, volatile/non-volatile computer readable media. For example, a storage system 1112 may be used to read and write a non-removable and a non-volatile magnetic medium (not shown in FIG. 11, also referred to as "hard drive"). Although not shown in FIG. 11, the computing device 1100 may include a disk drive used to read and write a movable and non-volatile disk (e.g., a floppy disk), an optical drive used to read and write a removable and non-volatile disc (e.g., a compact disc-read only memory (CD-ROM), a digital video disc-read only memory (DVD-ROM). In these cases, each drive may be connected to the bus 1130 via one or more data interfaces. The storage device 1110 may include at least one program product having at least one set of program modules, which are configured to perform the functions of some embodiments of the present disclosure.

A program 1114 having at least one set of program modules 1115 may be stored in, for example, the storage device 1110. The program modules 1115 may include an operating system, one or more applications, etc. The program modules 1115 may be configured to perform functions and/or methods in some embodiments of the present disclosure.

The computing device 1100 may communicate with one or more external devices 1170 (e.g., a keyboard, a pointing device, a camera, a display 1160), one or more devices that make a user interact with the computing device 1100, one or more devices (e.g., a network card, a modem) that make the computing device 1100 communication with any other computing devices a network card, modem. The communication may be implemented via an input/output (I/O) interface 1140. In some embodiments, the computing device 1100 may communicate with one or more networks (e.g., a local area network (LAN), a wide area network (WAN), a public network (e.g., Internet)) via a network adaptor 1150. As shown in FIG. 11, the network adaptor 1150 may communicate with other modules of the computing device 1100 via the bus 1130. It should be understood that although not shown in FIG. 11, other hardware and/or software modules may be used in combination with the computing device 1100, for example, a microcode, a device drive, a redundant processing unit, an external disk drive array, a disk array system, a redundant array of independent disks (RAID) system, a tape drive, a data backup storage system, etc.

The processor 1120 may execute programs stored in the storage device 1110 to performs various functional applications and data processing, for example, the voice audio data processing illustrated in FIGS. 4-10.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

Some embodiments of the present disclosure can also be embodied as follows:

Embodiment 1: A system, comprising:
at least one storage device including a set of instructions; and
at least one processor in communication with the at least one storage device, wherein when executing the set of instructions, the at least one processor is configured to cause the system to:
obtain voice audio data, which includes one or more voices, each being respectively associated with one of one or more subjects; and
for one of the one or more voices and the subject associated with the voice, generate a text based on the voice audio data, wherein:
the text has one or more sizes, each size corresponding to one of one or more volumes of the voice, and
the text has one or more colors, each color corresponding to one of one or more emotion types of the voice.

Embodiment 2. The system of embodiment 1, wherein the at least one processor is further configured to cause the system to instruct a display device to display the text.

Embodiment 3. The system of embodiment 2, wherein to determine one of the one or more emotion types and the color corresponding to the emotion type, the at least one processor is configured to cause the system to:
determine, based on the voice audio data, the emotion type with a trained emotion determination model; and
determine the color corresponding to the emotion type based on the emotion type.

Embodiment 4. The system of embodiment 1, wherein to determine the color corresponding to one of the one or more emotion types of the voice, the at least one processor is configured to cause the system to:
determine, based on the voice audio data, one or more preliminary emotion types and one or more confidence values corresponding to the one or more preliminary emotion types with a trained emotion determination model; and
determine the color corresponding to the emotion type of the voice based on the one or more preliminary emotion types and the one or more confidence values.

Embodiment 5. The system of embodiment 4, wherein to determine the color corresponding to the emotion type of the voice based on the one or more preliminary emotion types and the one or more confidence values, the at least one processor is configured to cause the system to:
determine one or more weights corresponding to the one or more preliminary emotion types based on the one or more confidence values;
determine one or more gamuts corresponding to the one or more preliminary emotion types; and
determine the color corresponding to the emotion type of the voice based on the one or more weights and the one or more gamuts.

Embodiment 6. The system of embodiment 1, wherein to determine the size corresponding to one of the one or more volumes of the voice, the at least one processor is configured to cause the system to:
obtain a reference size corresponding to a reference volume of a reference voice;
determine a ratio of the volume to the reference volume; and
determine the size corresponding to the volume of the voice based on the ratio and the reference size.

Embodiment 7. The system of embodiment 1, wherein to determine the size corresponding to one of the one or more volumes of the voice, the at least one processor is configured to cause the system to:
obtain a first size corresponding to a predetermined maximum volume;
obtain a second size corresponding to a predetermined minimum volume; and
determine the size corresponding to the volume of the voice based on the volume of the voice, the first size, the second size, the predetermined maximum volume, and the predetermined minimum volume.

Embodiment 8. The system of embodiment 1, wherein one of the one or more volumes of the voice includes a volume of the voice collected by a voice connection device or a volume of a voice source corresponding to the voice.

Embodiment 9. The system of embodiment 8, wherein the volume of the voice collected by the voice connection device is determined by:
determining an amplitude of the voice; and
determining the volume of the voice collected by the voice connection device based on the amplitude of the voice.

Embodiment 10. The system of embodiment 8, wherein the volume of the voice source corresponding to the voice is determined by:
determining a location of the voice source; and
determine the volume of the voice source based on the location of the voice source and the volume of the voice collected by the voice connection device using a volume attenuation equation.

Embodiment 11. The system of embodiment 1, wherein the at least one processor is configured to cause the system to:
  determine location information of a voice source corresponding to the voice; and
  instruct a display device to display the text based on the location information of the voice source.

Embodiment 12. The system of embodiment 11, wherein the voice audio data is collected by a voice collection device, the voice connection device including a plurality of voice collection modules disposed in different locations of an environment where the one or more subjects are located.

Embodiment 13. The system of embodiment 12, wherein the location information of the voice source includes at least one of a location of the voice source relative to a location of one of the plurality of voice collection modules or a distance between the voice source and one of the plurality of voice collection modules.

Embodiment 14. The system of embodiment 13, wherein to determine location information of a voice source corresponding to the voice, the at least one processor is configured to cause the system to:
  determine one or more phases of one or more signals corresponding to the voice collected by one or more of the plurality of voice connection modules, respectively;
  determine at least one phase difference between the one or more phases; and
  determine the location information of the voice source based on the at least one phase difference.

Embodiment 15. The system of embodiment 13, wherein to determine location information of a voice source corresponding to the voice, the at least one processor is configured to cause the system to:
  for each of at least two of the plurality of voice collection modules,
  determine a distance between the voice source and the voice collection module; and
  determine a spherical surface with a location of the voice collection module as a center and the distance as a radius; and
  determine the location information of the voice source based on location information of an intersection between at least two spherical surfaces corresponding to the at least two voice collection modules.

Embodiment 16. The system of embodiment 13, wherein to instruct a display device to display the text based on the location information of the voice source, the at least one processor is configured to cause the system to:
  determine a first coordinate of the one of the plurality of voice collection modules in a coordinate system;
  determine a second coordinate of the voice source in the coordinate system based on the first coordinate and the location information of the voice source; and
  instruct the display device to display the text at the second coordinate.

Embodiment 17. The system of embodiment 1, wherein the voice audio data is generated by transmitting a barrage by one of the one or more subjects.

Embodiment 18. A method implemented on a computing device having at least one processor, at least one storage medium, and a communication platform connected to a network, the method comprising:
  obtaining voice audio data, which includes one or more voices, each being respectively associated with one of one or more subjects; and
  for one of the one or more voices and the subject associated with the voice, generating a text based on the voice audio data, wherein:
    the text has one or more sizes, each size corresponding to one of one or more volumes of the voice, and
    the text has one or more colors, each color corresponding to one of one or more emotion types of the voice.

Embodiment 19. The method of embodiment 18, further comprising: instructing a display device to display the text.

Embodiment 20. The method of embodiment 19, wherein the determining one of the one or more emotion types and the color corresponding to the emotion type includes:
  determining, based on the voice audio data, the emotion type with a trained emotion determination model; and
  determining the color corresponding to the emotion type based on the emotion type.

Embodiment 21. The method of embodiment 18, wherein the determining the color corresponding to one of the one or more emotion types of the voice includes:
  determining, based on the voice audio data, one or more preliminary emotion types and one or more confidence values corresponding to the one or more preliminary emotion types with a trained emotion determination model; and
  determining the color corresponding to the emotion type of the voice based on the one or more preliminary emotion types and the one or more confidence values.

Embodiment 22. The method of embodiment 21, wherein the determining the color corresponding to the emotion type of the voice based on the one or more preliminary emotion types and the one or more confidence values includes:
  determining one or more weights corresponding to the one or more preliminary emotion types based on the one or more confidence values;
  determining one or more gamuts corresponding to the one or more preliminary emotion types; and
  determining the color corresponding to the emotion type of the voice based on the one or more weights and the one or more gamuts.

Embodiment 23. The method of embodiment 18, wherein the determining the size corresponding to one of the one or more volumes of the voice includes:
  obtaining a reference size corresponding to a reference volume of a reference voice;
  determining a ratio of the volume to the reference volume; and
  determining the size corresponding to the volume of the voice based on the ratio and the reference size.

Embodiment 24. The method of embodiment 18, wherein the determining the size corresponding to one of the one or more volumes of the voice includes:
  obtaining a first size corresponding to a predetermined maximum volume;
  obtaining a second size corresponding to a predetermined minimum volume; and
  determining the size corresponding to the volume of the voice based on the volume of the voice, the first size, the second size, the predetermined maximum volume, and the predetermined minimum volume.

Embodiment 25. The method of embodiment 18, wherein one of the one or more volumes of the voice includes a volume of the voice collected by a voice connection device or a volume of a voice source corresponding to the voice.

Embodiment 26. The method of embodiment 25, wherein the volume of the voice collected by the voice connection device is determined by:
  determining an amplitude of the voice; and determining the volume of the voice collected by the voice connection device based on the amplitude of the voice.

Embodiment 27. The method of embodiment 25, wherein the volume of the voice source corresponding to the voice is determined by:
determining a location of the voice source; and
determine the volume of the voice source based on the location of the voice source and the volume of the voice collected by the voice connection device using a volume attenuation equation.

Embodiment 28. The method of embodiment 18, further comprising:
determining location information of a voice source corresponding to the voice; and
instructing a display device to display the text based on the location information of the voice source.

Embodiment 29. The method of embodiment 28, wherein the voice audio data is collected by a voice collection device, the voice connection device including a plurality of voice collection modules disposed in different locations of an environment where the one or more subjects are located.

Embodiment 30. The method of embodiment 29, wherein the location information of the voice source includes at least one of: a location of the voice source relative to a location of one of the plurality of voice collection modules or a distance between the voice source and one of the plurality of voice collection modules.

Embodiment 31. The method of embodiment 30, wherein the determining location information of a voice source corresponding to the voice includes:
determining one or more phases of one or more signals corresponding to the voice collected by one or more of the plurality of voice connection modules, respectively;
determining at least one phase difference between the one or more phases; and
determining the location information of the voice source based on the at least one phase difference.

Embodiment 32. The method of embodiment 30, wherein the determining location information of a voice source corresponding to the voice includes:
for each of at least two of the plurality of voice collection modules,
determining a distance between the voice source and the voice collection module; and
determining a spherical surface with a location of the voice collection module as a center and the distance as a radius; and
determining the location information of the voice source based on location information of an intersection between at least two spherical surfaces corresponding to the at least two voice collection modules.

Embodiment 33. The method of embodiment 30, wherein the instructing a display device to display the text based on the location information of the voice source includes:
determining a first coordinate of the one of the plurality of voice collection modules in a coordinate method;
determining a second coordinate of the voice source in the coordinate method based on the first coordinate and the location information of the voice source; and
instructing the display device to display the text at the second coordinate.

Embodiment 34. The method of embodiment 18, wherein the voice audio data is generated by transmitting a barrage by one of the one or more subjects.

Embodiment 35. A non-transitory computer readable medium, comprising executable instructions that, when executed by at least one processor, directs the at least one processor to perform a method, the method comprising:
obtaining voice audio data, which includes one or more voices, each being respectively associated with one of one or more subjects; and
for one of the one or more voices and the subject associated with the voice, generating a text based on the voice audio data, wherein:
the text has one or more sizes, each size corresponding to one of one or more volumes of the voice, and
the text has one or more colors, each color corresponding to one of one or more emotion types of the voice.

Embodiment 36. A system, comprising:
at least one storage device including a set of instructions; and
at least one processor in communication with the at least one storage device, wherein when executing the set of instructions, the at least one processor is configured to cause the system to:
obtain voice audio data, which includes one or more voices, each being respectively associated with one of one or more subjects; and
for each of the one or more voices and the subject associated with the voice:
generate a text based on the voice audio data;
determine location information of a voice source corresponding to the voice based on the voice audio data; and
instruct a display device to display the text based on the location information of the voice source.

Embodiment 37. The system of embodiment 36, wherein the voice audio data is collected by a voice collection device, the voice collection device including a plurality of voice collection modules disposed in different locations of an environment where the one or more subjects are located.

Embodiment 38. The system of embodiment 37, wherein the location information of the voice source includes at least one of: a location of the voice source relative to a location of one of the plurality of voice collection modules or a distance between the voice source and one of the plurality of voice collection modules.

Embodiment 39. The system of embodiment 38, wherein to determine location information of a voice source corresponding to the voice based on the voice audio data, the at least one processor is configured to cause the system to:
determine one or more phases of one or more signals corresponding to the voice collected by one or more of the plurality of voice connection modules, respectively;
determine at least one phase difference between the one or more phases; and
determine the location information of the voice source based on the at least one phase difference.

Embodiment 40. The system of embodiment 38, wherein to determine location information of a voice source corresponding to the voice based on the voice audio data, the at least one processor is configured to cause the system to:
for each of at least two of the plurality of voice collection modules,
determine a distance between the voice source and the voice collection module; and
determine a spherical surface with a location of the voice collection module as a center and the distance as a radius; and
determine the location information of the voice source based on location information of an intersection between at least two spherical surfaces corresponding to the at least two voce collection modules.

Embodiment 41. The system of embodiment 38, wherein to instruct a display device to display the text based on the location information of the voice source, the at least one processor is configured to cause the system to:
- determine a first coordinate of the one of the plurality of voice collection modules in a coordinate system;
- determine a second coordinate of the voice source in the coordinate system based on the first coordinate and the location information of the voice source; and
- instructing the display device to display the text at the second coordinate.

Embodiment 42. The system of embodiment 36, wherein
- the text has one or more sizes, each size corresponding to one of one or more volumes of the voice; and
- the text has one or more colors, each color corresponding to one of one or more emotion types of the voice.

Embodiment 43. A method implemented on a computing device having at least one processor, at least one storage medium, and a communication platform connected to a network, the method comprising:
- obtaining voice audio data, which includes one or more voices, each being respectively associated with one of one or more subjects; and
- for each of the one or more voices and the subject associated with the voice:
- generating a text based on the voice audio data;
- determining location information of a voice source corresponding to the voice based on the voice audio data; and
- instructing a display device to display the text based on the location information of the voice source.

Embodiment 44. The method of embodiment 43, wherein the voice audio data is collected by a voice collection device, the voice collection device including a plurality of voice collection modules disposed in different locations of an environment where the one or more subjects are located.

Embodiment 45. The method of embodiment 44, wherein the location information of the voice source includes at least one of a location of the voice source relative to a location of one of the plurality of voice collection modules or a distance between the voice source and one of the plurality of voice collection modules.

Embodiment 46. The method of embodiment 45, wherein the determining location information of a voice source corresponding to the voice based on the voice audio data includes:
- determining one or more phases of one or more signals corresponding to the voice collected by one or more of the plurality of voice connection modules, respectively;
- determining at least one phase difference between the one or more phases; and
- determining the location information of the voice source based on the at least one phase difference.

Embodiment 47. The method of embodiment 45, wherein the determining location information of a voice source corresponding to the voice based on the voice audio data includes:
- for each of at least two of the plurality of voice collection modules,
- determining a distance between the voice source and the voice collection module; and
- determining a spherical surface with a location of the voice collection module as a center and the distance as a radius; and
- determining the location information of the voice source based on location information of an intersection between at least two spherical surfaces corresponding to the at least two voce collection modules.

Embodiment 48. The method of embodiment 45, wherein the instructing a display device to display the text based on the location information of the voice source includes:
- determining a first coordinate of the one of the plurality of voice collection modules in a coordinate system;
- determining a second coordinate of the voice source in the coordinate system based on the first coordinate and the location information of the voice source; and
- instructing the display device to display the text at the second coordinate.

Embodiment 49. The method of embodiment 43, wherein
- the text has one or more sizes, each size corresponding to one of one or more volumes of the voice; and
- the text has one or more colors, each color corresponding to one of one or more emotion types of the voice.

Embodiment 50. A non-transitory computer readable medium, comprising executable instructions that, when executed by at least one processor, directs the at least one processor to perform a method, the method comprising:
- obtaining voice audio data, which includes one or more voices, each being respectively associated with one of one or more subjects; and
- for each of the one or more voices and the subject associated with the voice:
- generating a text based on the voice audio data;
- determining location information of a voice source corresponding to the voice based on the voice audio data; and
- instructing a display device to display the text based on the location information of the voice source.

We claim:
1. A system, comprising:
   at least one storage device including a set of instructions; and
   at least one processor in communication with the at least one storage device, wherein when executing the set of instructions, the at least one processor is configured to cause the system to:
   obtain voice audio data, which includes one or more voices, each being respectively associated with one of one or more subjects;
   for one of the one or more voices and the subject associated with the voice, generate a text based on the voice audio data, wherein:
   the text has one or more sizes, each size corresponding to one of one or more volumes of the voice, and
   the text has one or more colors, each color corresponding to one of one or more emotion types of the voice;
   determine location information of a voice source corresponding to the voice, wherein the location information includes at least one of a location of the voice source relative to a location of one of a plurality of voice collection modules or a distance between the voice source and one of the plurality of voice collection modules;
   instruct a display device to display the text based on the location information of the voice source to indicate the location information of the voice source;
   determine a first coordinate of the one of the plurality of voice collection modules in a coordinate system;

determine a second coordinate of the voice source in the coordinate system based on the first coordinate and the location information of the voice source; and instruct the display device to display the text at the second coordinate, the text indicating the location information of the voice source.

2. The system of claim 1, wherein the at least one processor is further configured to cause the system to instruct a display device to display the text.

3. The system of claim 2, wherein to determine one of the one or more emotion types and the color corresponding to the emotion type, the at least one processor is configured to cause the system to:
determine, based on the voice audio data, the emotion type with a trained emotion determination model; and
determine the color corresponding to the emotion type based on the emotion type.

4. The system of claim 1, wherein to determine the color corresponding to one of the one or more emotion types of the voice, the at least one processor is configured to cause the system to:
determine, based on the voice audio data, one or more preliminary emotion types and one or more confidence values corresponding to the one or more preliminary emotion types with a trained emotion determination model; and
determine the color corresponding to the emotion type of the voice based on the one or more preliminary emotion types and the one or more confidence values.

5. The system of claim 4, wherein to determine the color corresponding to the emotion type of the voice based on the one or more preliminary emotion types and the one or more confidence values, the at least one processor is configured to cause the system to:
determine one or more weights corresponding to the one or more preliminary emotion types based on the one or more confidence values;
determine one or more gamuts corresponding to the one or more preliminary emotion types; and
determine the color corresponding to the emotion type of the voice based on the one or more weights and the one or more gamuts.

6. The system of claim 5, wherein to determine the color corresponding to the emotion type of the voice based on the one or more weights and the one or more gamuts, the at least one processor is configured to cause the system to:
determine the color corresponding to the emotion type of the voice by performing a weighted summation of the one or more gamuts based on the one or more weights.

7. The system of claim 1, wherein to determine the size corresponding to one of the one or more volumes of the voice, the at least one processor is configured to cause the system to:
obtain a reference size corresponding to a reference volume of a reference voice;
determine a ratio of the volume to the reference volume; and
determine the size corresponding to the volume of the voice based on the ratio and the reference size.

8. The system of claim 1, wherein to determine the size corresponding to one of the one or more volumes of the voice, the at least one processor is configured to cause the system to:
obtain a first size corresponding to a predetermined maximum volume;
obtain a second size corresponding to a predetermined minimum volume; and
determine the size corresponding to the volume of the voice based on the volume of the voice, the first size, the second size, the predetermined maximum volume, and the predetermined minimum volume.

9. The system of claim 1, wherein the voice audio data is collected by a voice collection device, the voice collection device including a plurality of voice collection modules disposed in different locations of an environment where the one or more subjects are located.

10. The system of claim 1, wherein to determine location information of a voice source corresponding to the voice, the at least one processor is configured to cause the system to:
determine one or more phases of one or more signals corresponding to the voice collected by one or more of the plurality of voice collection modules, respectively;
determine at least one phase difference between the one or more phases; and
determine the location information of the voice source based on the at least one phase difference.

11. The system of claim 1, wherein to determine location information of a voice source corresponding to the voice, the at least one processor is configured to cause the system to:
for each of at least two of the plurality of voice collection modules,
determine a distance between the voice source and the voice collection module; and
determine a spherical surface with a location of the voice collection module as a center and the distance as a radius; and
determine the location information of the voice source based on location information of an intersection between at least two spherical surfaces corresponding to the at least two voce collection modules.

12. The system of claim 1, wherein the at least one processor is configured to cause the system to:
determine a third coordinate of a first voice source of a first subject;
determine a fourth coordinate of a second voice source of a second subject, the third coordinate being different from the fourth coordinate; and
instruct the display device to display a first text from the first subject at the third coordinate and display a second text from the second subject at the fourth coordinate to distinguish different contents from different subjects.

13. A method implemented on a computing device having at least one processor, at least one storage medium, and a communication platform connected to a network, the method comprising:
obtaining voice audio data, which includes one or more voices, each being respectively associated with one of one or more subjects;
for one of the one or more voices and the subject associated with the voice, generating a text based on the voice audio data, wherein:
the text has one or more sizes, each size corresponding to one of one or more volumes of the voice, and
the text has one or more colors, each color corresponding to one of one or more emotion types of the voice;
determining location information of a voice source corresponding to the voice, wherein the location information includes at least one of a location of the voice source relative to a location of one of a plurality of voice collection modules or a distance between the voice source and one of the plurality of voice collection modules;

instructing a display device to display the text based on the location information of the voice source to indicate the location information of the voice source;

determining a first coordinate of the one of the plurality of voice collection modules in a coordinate system;

determining a second coordinate of the voice source in the coordinate system based on the first coordinate and the location information of the voice source; and instructing the display device to display the text at the second coordinate, the text indicating the location information of the voice source.

14. The method of claim 13, wherein the determining one of the one or more emotion types and the color corresponding to the emotion type includes:

determining, based on the voice audio data, the emotion type with a trained emotion determination model; and determining the color corresponding to the emotion type based on the emotion type.

15. The method of claim 13, wherein the determining the color corresponding to one of the one or more emotion types of the voice includes:

determining, based on the voice audio data, one or more preliminary emotion types and one or more confidence values corresponding to the one or more preliminary emotion types with a trained emotion determination model; and determining the color corresponding to the emotion type of the voice based on the one or more preliminary emotion types and the one or more confidence values.

16. The method of claim 15, wherein the determining the color corresponding to the emotion type of the voice based on the one or more preliminary emotion types and the one or more confidence values includes:

determining one or more Weights corresponding to the one or more preliminary emotion types based on the one or more confidence values;

determining one or more gamuts corresponding to the one or more preliminary emotion types; and determining the color corresponding to the emotion type of the voice based on the one or more Weights and the one or more gamuts.

17. A non-transitory computer readable medium, comprising executable instructions that, when executed by at least one processor, directs the at least one processor to perform a method, the method comprising:

obtaining voice audio data, which includes one or more voices, each being respectively associated with one of one or more subjects;

for one of the one or more voices and the subject associated with the voice, generating a text based on the voice audio data, wherein:

the text has one or more sizes, each size corresponding to one of one or more volumes of the voice, and the text has one or more colors, each color corresponding to one of one or more emotion types of the voice;

determining location information of a voice source corresponding to the voice, wherein the location information includes at least one of a location of the voice source relative to a location of one of a plurality of voice collection modules or a distance between the voice source and one of the plurality of voice collection modules;

instructing a display device to display the text based on the location information of the voice source to indicate the location information of the voice source;

determining a first coordinate of the one of the plurality of voice collection modules in a coordinate system;

determining a second coordinate of the voice source in the coordinate system based on the first coordinate and the location information of the voice source; and instructing the display device to display the text at the second coordinate, the text indicating the location information of the voice source.

18. The non-transitory computer readable medium of claim 17, the method further comprising:

causing the system to instruct a display device to display the text.

* * * * *